Jan. 20, 1970     H. MARSCHALL ET AL     3,490,565
PISTON ASSEMBLY FOR DUAL-NETWORK DISK-BRAKE SYSTEM
Filed Nov. 8, 1967     6 Sheets-Sheet 1
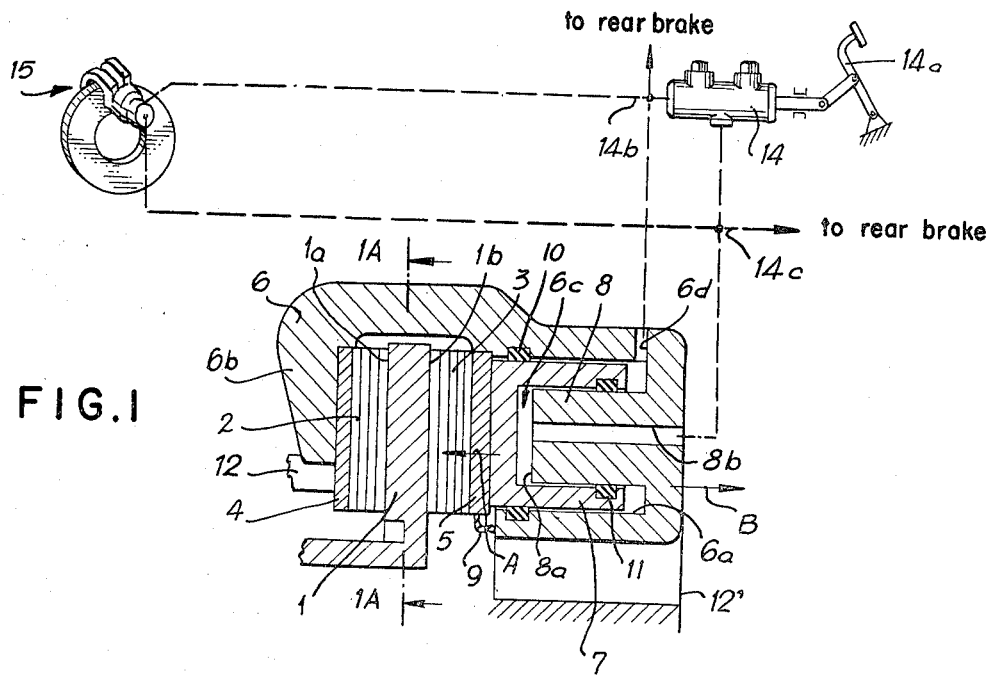
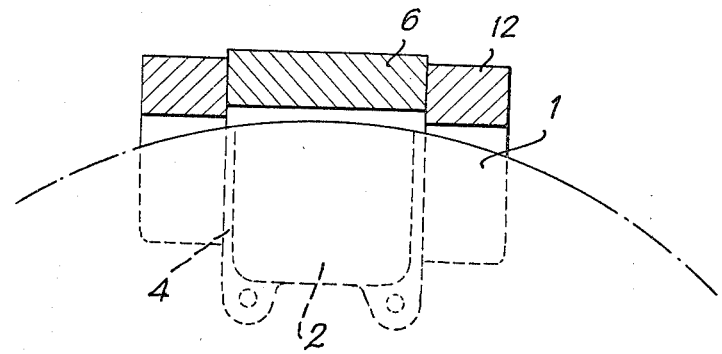
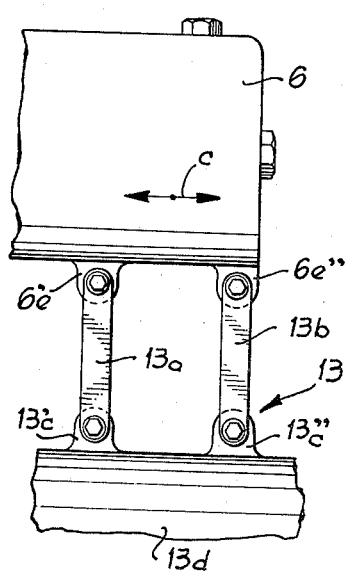
Helmut Marschall
Wolfgang Kammermayer
Hans A. Beller
Heinz Hahm
Juan Belart
INVENTORS.
BY
Karl F. Ross
ATTORNEY Jan. 20, 1970    H. MARSCHALL ET AL    3,490,565
PISTON ASSEMBLY FOR DUAL-NETWORK DISK-BRAKE SYSTEM
Filed Nov. 8, 1967                            6 Sheets-Sheet 3
FIG.3
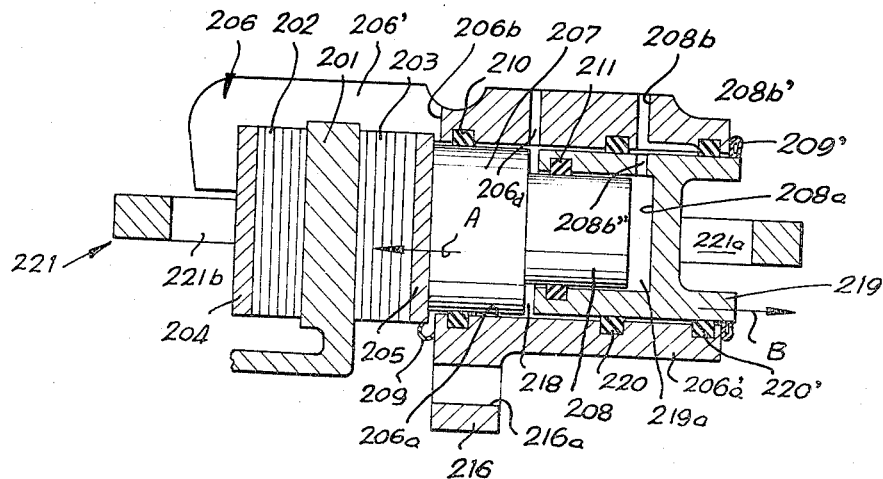
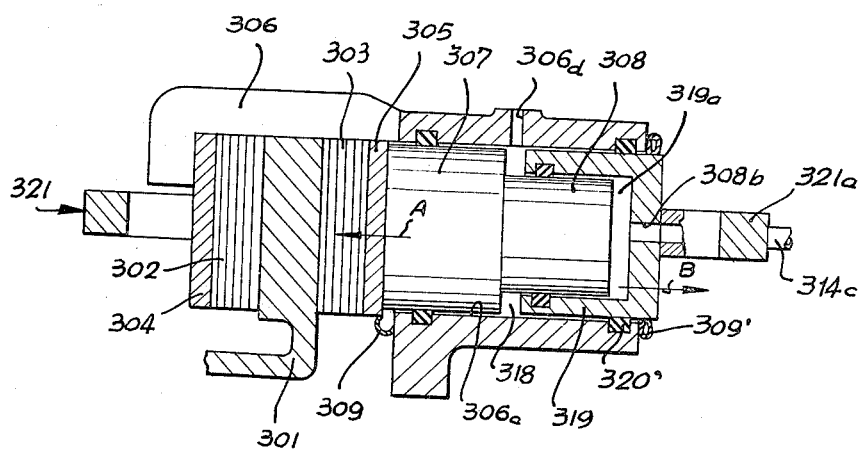
FIG.3b
BY
*Karl F. Ross*
ATTORNEY

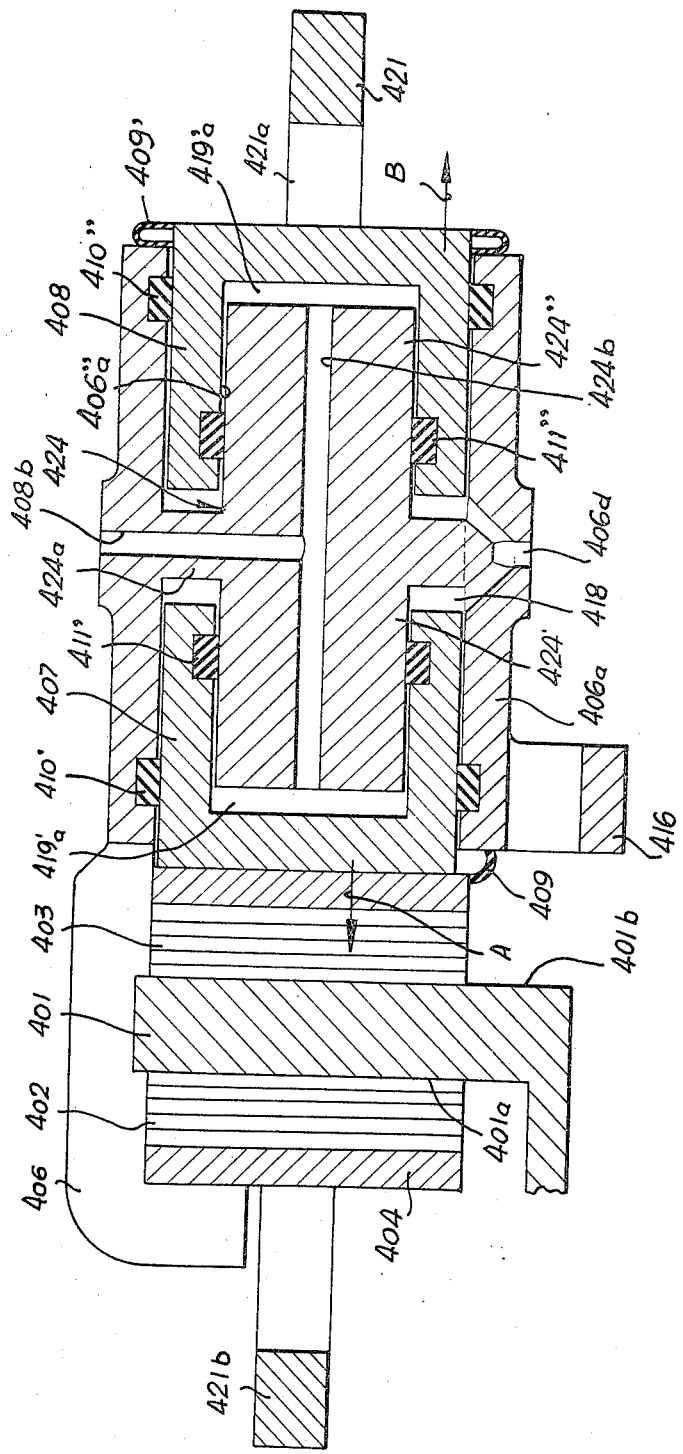

United States Patent Office 3,490,565
Patented Jan. 20, 1970

3,490,565
PISTON ASSEMBLY FOR DUAL-NETWORK DISK-BRAKE SYSTEM
Helmut Marschall, Frankfurt am Main, Wolfgang Kammermayer, Frankfurt, Fechenheim, Hans Albert Beller, Bad Vilbel, Juan Belart, Walldorf, Hessen, and Heinz Hahm, Frankfurt am Main, Germany, assignors to Alfred Teves GmbH, Frankfurt am Main, Germany, a corporation of Germany
Filed Nov. 8, 1967, Ser. No. 681,330
Claims priority, application Germany, Nov. 16, 1966, T 32,523; Dec. 16, 1966, T 32,765, T 32,766, T 32,768, T 32,769; Dec. 17, 1966, T 32,784, T 32,785; Feb. 7, 1967, T 33,161
Int. Cl. B60t 11/10; F16d 65/14
U.S. Cl. 188—152                           9 Claims

ABSTRACT OF THE DISCLOSURE

A vehicle-brake system having a tandem or twin master cylinder for delivering the brake fluid to independent transmission networks each connected with one compartment of a disk brake whose actuating cylinder is located on one side of the brake disk and receives at least one piston defining its working compartments or chambers therein. A pair of pistons are provided, so that the chambers are disposed to one side of the direct-acting piston while the other piston applies pressure to the brake housing or to a force-transmission frame extending around the disk. A double-acting valve maintains the effective cross-section of the actuating assembly in spite of loss of pressure in one of the transmission networks.

---

Our present invention relates to improvements in dual-network brake systems and, more particularly, to a piston assembly for dual-network brakes and, especially, disk-type brakes.

The use of so-called "dual-network" brake systems, because of increased safety, has gained in interest of late and, in fact, is required in many jurisdictions. The term "dual-network brake system" as used therein is intended to designate a vehicular brake system in which the master cylinder is subdivided into a pair of chambers, each of which may communicate with a respective compartment of a subdivided brake-fluid reservoir, and receives a respective master-cylinder piston operated by the brake pedal of the vehicle. In so-called "tandem master cylinders," the master cylinder chambers are disposed one behind the other and the coaxially aligned but axially spaced pistons received in these chambers can be coupled by rods, springs or force-transmitting systems. From each of the master cylinder chambers, a respective fluid-transmission network of tubes or lines runs to the respective sets of wheel-brake cylinders. In general, earlier systems using dual transmission networks have connected the master-cylinder chambers with respective sets of wheel-brake cylinders. Thus, if the vehicle was equipped with front-wheel brakes and rear-wheel brakes, one transmission network communicated with all of the wheel-brake cylinders of the front-wheel brakes while the other communicated with the wheel-brake cylinders of the rear-wheel brakes; in another arrangement, a number of wheel-brake cylinders were provided on each of the wheel brakes for applying respective pads or brakeshoes against the single rotating surface at each wheel brake. The rotating surface was either the inner face of a drum when drum-type internal-expansion brakes were employed, or a disk whose braking faces lay in planes generally transversely to its axis of rotation. In devices of the latter type, each of the hydraulic-fluid networks communicated with one of the wheel-brake cylinders of each wheel brake so that, in the event of failure in one fluid-transmission system, the other system would remain effective, albeit to a lesser degree, to brake all of the wheels. In general, disk-brake assemblies using wheel-brake cylinders mounted in opposite lobes of a support yoke extending around the periphery of the disk have proved to be of relatively complex manufacture, especially since the numerous cylinder bores must be precision-formed independently of one another.

It is, therefore, the principal object of the present invention to provide an improved disk-brake system for automotive vehicles which may be operable by dual-network master cylinders and the like and yet avoid the disadvantages of prior-art brake systems.

A corollary object of this invention is to provide an improved fluid-responsive cylinder assembly for disk-type brakes.

Yet another object of our invention is to provide an improved dual-network brake system for automotive vehicles which is of reduced cost and complexity by comparison with earlier systems.

Yet a further object of the instant invention is to provide a disk brake for automotive vehicles which can be energized from a tandem or twin master cylinder and yet has an actuating cylinder on only one side of the wheel-brake housing.

A more specific object of this invention is to provide a disk brake capable of withstanding the stresses resulting from frictional engagement of the brakeshoes with the disk and yet of relatively small dimensions and with a minimum number of parts and few force-transmitting members.

Another object of our invention is to provide a disk brake in a dual-network brake system in which the failure of one of the networks will not give rise to unduly increased brake-pedal stroke and which applies substantially the same braking frictional surface and/or brake force in spite of such failure.

We have now found that these objects can be achieved in a disk-brake system which comprises a brake housing reaching around the periphery of a brake disk connected with a wheel of the automotive vehicle and having at one side of this disk an actuating cylinder containing at least one piston subdividing this cylinder into a pair of independent working chambers effective to urge the brakeshoes flanking the disk in opposite directions against the latter, the chambers being supplied with brake fluid from respective fluid-transmission networks to which the brake fluid is delivered from dual-compartment master cylinder assemblies. The master-cylinder assemblies can include tandem-type master cylinders in which the compartments are disposed one behind the other, or so-called "twin" master cylinders in which the compartments are disposed side by side.

According to a particular feature of this invention, the brake housing is shiftable relatively to the disk and bears directly against the brakeshoe remote from the actuating cylinder so that reaction force generated by supplying fluid under pressure to the aforementioned chambers shifts the brake yoke to indirectly apply its brakeshoes to the disk.

A pair of pistons may be provided in the actuating cylinder, which defines the working chambers, and have coaxial surfaces effective in opposite directions, one of the pistons being connected with or acting upon the housing while the other bears directly upon the brakeshoe. Proximal to the actuating cylinder a two-way valve may be provided between these cylinders to bleed brake fluid under pressure to an inner chamber between the pistons and thereby ensure the application of the applied pressure over the full cross-section of the cylinder bore to both pistons regardless of failure of one of the fluid-transmission lines. In a variant of this basic system, the piston can be stepped, i.e. provided with a large-diameter portion defining an annular outer compartment and a small-diameter portion defining the other compartment.

Still another aspect of this invention resides in the mounting of the brake housing carrying the actuating cylinder fixedly with respect to the disk, whereby a force-transmission member defines the second compartment with the direct-acting piston which may also be stepped in the manner indicated. In this case, we have found it desirable to constitute the force-transmitting member as a frame extending around the disk and the brake housing and shiftable relatively thereto, the frame lying in a plane which intersects the disk along a secant thereof. Thus, either the frame or the brake housing may be a force-transmitting member for applying the remote brakeshoe to the disk. The force-transmitting member can, in accordance with a particular feature of the invention, be mounted so as to constitute a floating or swingable element; alternatively or additionally, a parallelogrammatic linkage may be provided between this movable element and the stationary part of the vehicle body or frame, e.g. the axle housing. Moreover, we have found it to be advantageous to constitute one or both of the pistons as cup-shaped members receiving a self-adjusting mechanism for advancing the rest position of the piston to compensate for brake-lining wear and/or to lock the piston together upon failure of the fluid-transmission lines, thereby allowing one of the chambers to operate the brake as fully as if both pistons would be pressurized. In this connection, a disk-shaped piston may be provided which either serves as one of the pistons in a movable-yoke arrangement, or forms a partition between the pistons and acts as a force-transmitting member upon failure in one of the transmission lines.

Advantageously, the actuating cylinder is provided with a minimum number of sealing rings engaging the piston or pistons along their cylindrical peripheries at locations remote from the working chambers defined thereby. Moreover, the passages communicating with the chambers may open axially or radially into the latter and the brake housing or yoke, whether stationary or movable, is of a unitary construction and U-shaped configuration so as to take up the lateral stress upon the brakeshoes. We have further found that it is desirable, whether the housing is shiftable or rigid, to provide a secondary or auxiliary yoke extending around the periphery of the disk and flanking the brake housing to take up at least in part the lateral stresses derived upon engagement of the brakeshoes with the disk.

The above and other objects, features and advantages of the present invention will become more readily apparent from the following description, reference being made to the accompanying drawing in which:

FIG. 1 is a diagrammatic view of a vehicle-brake system using a tandem master cylinder and showing one of the wheel brakes in fragmentary axial cross-section;

FIG. 1A is a cross-sectional view taken generally along the lines IA–IA of FIG. 1;

FIG. 1B is an elevational view showing a parallelogrammatic linkage coupling the brake housing of FIGS. 1 and 1A with a stationary portion of the vehicle, namely its axle housing;

FIG. 3 is a fragmentary axial cross-sectional view of a disk brake having a force-transmission frame, a stepped piston and a relatively stationary brake housing;

FIG. 3B is an axial cross-sectional view of a modification of the system of FIG. 3;

FIG. 4 is an axial cross-sectional view through a brake assembly using a housing having a unitary core and cup-shaped pistons;

Figure 2:
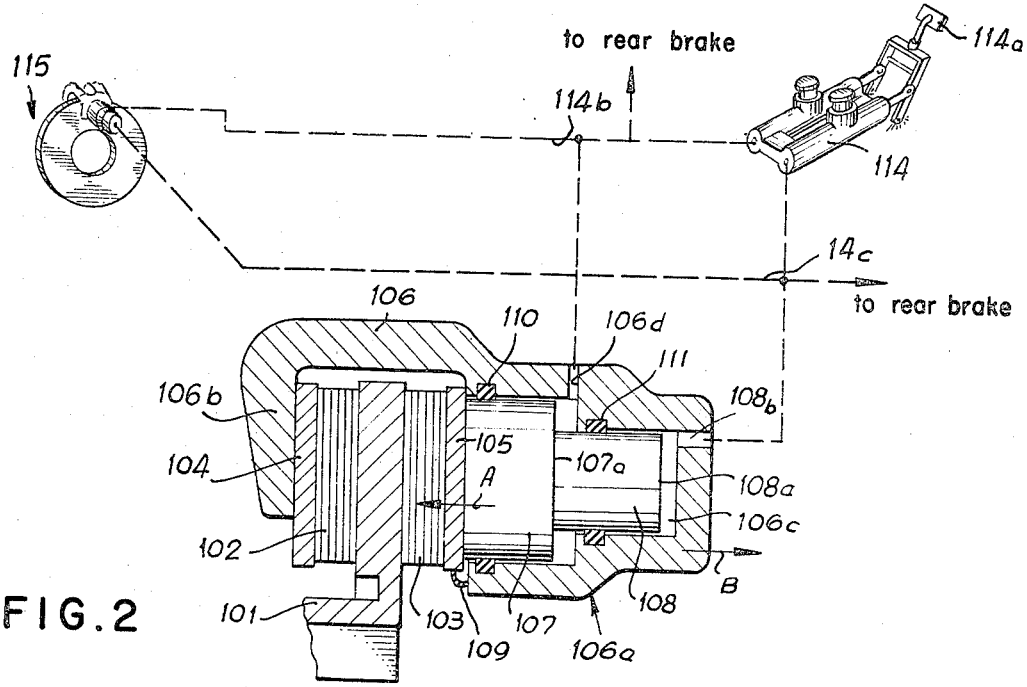
FIG. 2 is a view similar to FIG. 1 in which the wheel brake has a stepped piston.

In FIGS. 1 and 1A, we show a disk-brake system in which the unitary, U-shaped brake yoke 6 is provided with a single-step cylinder bore 6a at the right-hand lobe of the yoke and reaches around the periphery of the brake disk 1 with a flange 6b to engage a brakeshoe whose lining 2 confronts the braking surface or face 1a of the disk 1. The lining 2 is bonded to a backing plate 4 which is affixed to the downwardly turned flange 6b of the yoke 6. The other face 1b of disk 1, which is connected with the wheel axle and or wheel disk of the vehicle, is juxtaposed with the brake lining 3 whose backing plate 5 carries this brake lining and forms a brake pad or shoe therewith. To prevent entrainment of the yoke 6 with the disk 1, a frame 12 is provided to flank the yoke 6 (see FIG. 1A) and take up the torque applied to this frame when the yoke 6 seizes the disk 1 at 12'. This auxiliary yoke or frame 12 is secured to the vehicle shaft, body or chassis frame so as to be rigid therewith.

The actuating means in the right-hand lobe of the yoke 6 comprises a pair of telescopingly interfitted pistons 7 and 8, the former being constituted as a cup-shaped piston abutting the backing plate 5 of the right-hand brakeshoe and designed to urge it directly against the brake disk 1. The other piston 8 is of a smaller diameter, although its effective face 8a may have the same surface area as the effective face 7a of piston 7 and is unitarily integral with the yoke 6. The inner piston 8 is designed to apply braking force in the direction of arrow B to the brakeshoe 2, 4 on the other side of the disk. Thus, the outer piston 7 defines within the cylinder 6a a working chamber 6c to which hydraulic brake fluid can be supplied via a central bore 8b in the piston 8 while the outer annular chamber is supplied with fluid via a radial bore 6d, as will be described in greater detail hereinafter.

Chamber 6a is sealed by a sealing ring 10 recessed in the wall of the cylinder bore and engaging the periphery of piston 7 at a location remote from its normal effective face 7a. Similarly, a sealing ring 11 is cited in the wall of chamber 6c defined by the piston 7 and slidably engages a piston 8 at a location remote from its normal effective face 8a. Thus, each of the sliding and sealed surfaces of the piston is engaged by only a single sealing ring which contacts it at a location farthest from its hydraulically chargeable working compartment. A dust cap 9 connects the yoke 6 around the cylinder 6a with the brakeshoe 3, 5 to prevent entry of contaminants into the cylinder bore 6a.

The yoke 6 can, of course, form part of a floating or oscillating (swingable) housing structure of the type conveniently used in disk brakes in which the yoke is movable to permit the actuating means to be disposed at only one side of the disk. An assembly of this character may also be formed with a parallelogrammatic linkage 13 as illustrated for example in FIG. 1B. Thus, the yoke 6 may be provided with a pair of lugs 6e' and 6e" in axially spaced relation in which a pair of parallel links 13a and 13b are pivotally mounted. The links 13a and 13b may also be pivotally connected at their opposite ends to lugs 13c' and 13c" coplanar with the lugs 6e' and 6e" spaced apart by identical distances. The lengths of the length 13a and 13b are identical. Consequently, the distance between the axes of lugs 6e' and 6e" forms one fixed-length arm of the yoke 6 while the other arm is defined between the lugs 13c' and 13c" of the axle housing 13d. One or more of the pivots joining the arms 13a and 13b with the lugs may be provided with a friction member preventing displacement of the linkage 13 except under the hydraulic action of the brake. The yoke 6, however, will move parallel to itself as represented by arrow C. It will be understood that the linkage 13 may be used for the brake yokes of all subsequently described embodiments whenever a movement of the yokes relative to the disk is required to transfer force to the brakeshoe opposite the side of the yoke in which the actuating cylinder is provided. Moreover, the linkage 13 can be considered representative of both swingable and floating yokes since, while the yoke 6 moves parallel to itself (arrow C), it nevertheless swings about the pivots formed by the lugs 13c' and 13c" and shifts axially as a floating-yoke housing.

Reverting to FIGS. 1 and 1A, it can be seen that the assembly of FIG. 1 is supplied with brake fluid from a tandem master cylinder 14 which is actuated by a brake pedal 14a to displace brake fluid into the independent fluid-transmission networks 14b and 14c. A further wheel brake is represented at 15 in FIG. 1 to indicate that all of the wheel brakes of this arrangement are energized in parallel. Thus the network 14b communicates with the working chamber 6a behind the piston face 7a of piston 7 as well as with the corresponding piston of the wheel brake 15 while network 14c communicates with the passage 8b and working compartments 6c. The tandem cylinder 14 is representative of the two-compartment master cylinders designed to function with each of the wheel-brake arrangements described below.

In normal operation, depression of the brake pedal 14a drives hydraulic fluid simultaneously to both networks 14b and 14c, thereby distributing it similarly to the wheel brakes 15, etc. of the vehicle. In FIG. 1, the structural detail of only one of these wheel brakes is shown, although it will be understood that all of the wheel brakes are similarly constructed. Thus fluid is delivered uniformly to the chambers 6a and 8a of the yoke 5 and displaces the piston 7 in the direction of arrow A, and piston 8 in the direction of arrow B, thereby clamping the disk 1 between the brakeshoes 1, 3 and 2, 4. When, however, there is a failure in one of the networks (e.g. 14b), chamber 5a is not supplied with fluid, although, because the networks are independent, brake fluid under pressure is delivered via bore 8b to the chamber 8a. In this case, the pistons 7 and 8 are displaced away from one another to apply the brake regardless of the failure in the network 14b. Conversely, failure in line 14c will vent chamber 8a to the atmosphere through the defect, although fluid is supplied to chamber 6a via port 6d and again fluid pressure in opposite direction urges the pistons 7 and 8 away from one another and permits application of the brake.

The coaxial arrangement of the working compartments ensures uniform application of the brake unlike the four-cylinder assembly hitherto required to ensure pincerlike engagement of the disk when one of the networks fails. The telescoping character of the pistons enables the entire unit to be relatively compact and the one-sided arrangement of the actuating assembly necessitates the precision boring of only a single cylinder in the brake housing. Since the action and reaction surfaces defining the working chambers between the pistons may have similar areas, both pistons apply uniform brake force to the disk, although, upon failure in one of the networks, a greater pressure is required in the brake pedal to ensure the same total brake force as obtained when both working chambers are effective. The unique assembly of FIGS. 1, 1A also has the advantage that only two seals are required, with at least one seal separating the two chambers for uniform lubrication by the brake fluid.

In FIG. 2, we show another embodiment of this invention wherein the U-shaped yoke 106 extending around the periphery of the disk 101 draws a brakeshoe 102, 104 thereagainst when hydraulic fluid is supplied to the cylinder lobe 106a of the brake, as is described below. The backing plate 104 of this brakeshoe is affixed to the flange 106b and carries the lining 102 which frictionally engages the juxtaposed face of the disk. Along the other flank of the disk 101, we provide a brakeshoe whose lining 103 engages the disk 101 when urged in the direction A by a piston structure 107, 108 slidable in the cylinder 106a. Lining 103 is bonded to a backing plate 105 of this brakeshoe. In accordance with the principles of this aspect of the invention, the piston is a stepped member having a large-diameter portion unitarily integral with a small-diameter portion 108 and directly abutting the backing plate 105 of the brakeshoe 103, 105 which is also engaged by a dust-excluding cup 109, as previously described. The cylinder bore is here subdivided into a pair of coaxial steps including a chamber 106c in which the small-diameter step 108 of the piston has an effective face 108a and to which brake fluid is supplied via an axial bore 108b from the fluid-transmission network 114c. The large-diameter step 107 has an effective annular face 107a exposed to fluid pressure in the large-diameter chamber to which fluid is supplied via a radial bore 106d communicating with the fluid-transmission network 114b. The faces 108a and 107a may have identical areas.

In this embodiment, the master cylinder 114 is of the twin-cylinder type which in the cylinder chambers are disposed side by side for joint operation by the brake pedal 114a. A furtherwheel brake is replaced at 115 to indicate that all of the wheel brakes may be of the construction illustrated in section in FIG. 2 and may be operated in parallel. The piston portions 107 and 108 have cylindrical surfaces sealing engaged by rings 110 and 111 recessed in the walls of the large- and small diameter steps of the cylinder bore, respectively, and engaging these surfaces at locations as far as possible from their effective bases 107a and 108a and, therefore, the corresponding working chambers. The yoke 106 may be mounted in the frame illustrated at 12 in FIG 1A and may be a floating or swingable yoke, as previously described, and can be provided with the parallogrammatic linkage 13 in FIG. 1B. It will be understood that FIGS. 1A and 1B correspond to views of the assembly in FIG. 2 provided with these variants. Moreover, the twin cylinder 114 will be understood as suitable for use with the wheel brakes of any of the preceding and succeeding figures.

When the brake pedal 114a is depressed, the brake fluid is normally supplied in parallel to both working chambers and the corresponding pressure upon surfaces 107a and 108a displaces the brakeshoe 103, 105 against the disk, while in traction force against the yoke 106 draws the brakeshoe 102, 104 in the direction of arrow B into contact with the disk for normal brake operation. If one of the brake netwoks fails, the working chamber associating with the other networks will nevertheless be charged with brake fluid to apply the brakes in the manner previously described.

In other respects, the embodiment of FIG. 2 functions similarly to that of FIG. 1. Regardless of which network fails, moreover, the total friction surface supplied to the disks of the entire system will remain the same as is applied during normal brake operation and no greater flud demand develops, although greater foot pressure may be necessary to achieve the same braking force. It may, moreover, be desirable to dimension the steps of the cylinder bore and the effective surface areas 107a and 108a differently, whereby the force supplied to the brakeshoes will be directly related to the surface area of whichever piston face is effective when the other fails. Here, too, the advantage of compact construction of relatively small length, minimum number of seals, etc. is inherent in the construction.

Figure 3A:
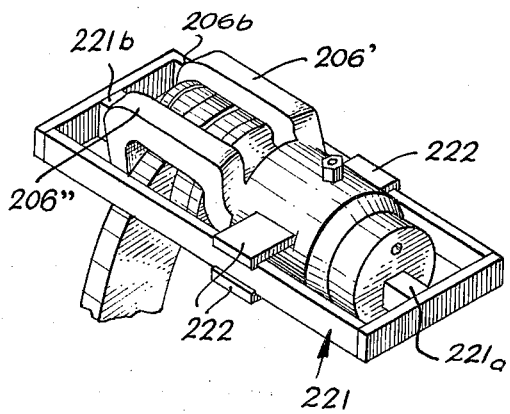
FIG. 3A is a perspective view diagrammatically illustrating the the relationship of the frame to the brake housing.

In FIGS. 3, 3A and 3B, we show another embodiment of the basic modification described in connection with FIG. 2 wherein a unitary stepped piston on one side of the brake housing is slidably received in a pair of working chambers supplied from individual compartments of the master cylinder. In the system of FIG. 2 by contrast, the stepped bore is provided in the axially shiftable housing which, as has been indicated, is a floating, swingable or similar yoke (e.g. connected via the parallelogrammatic linkage 13 with the vehicle frame). In the system of FIGS. 3, 3A and 3B, a simplified force-transmission structure is illustrated.

Referring initially to FIG. 3, it can be seen that the basic components of this modification consist of a generally U-shaped yoke 206 whose bifurcate arms 206' and 206" reach around the periphery of the disk 201 which, as has been previously indicated, is coupled with the rotatable portion of the vehicle-wheel assembly, e.g. the tire-carrying disk and axle. The yoke or housing 206 is affixed at the right-hand side to the axle housing or vehicle frame by a flange 216 whose bores 216a receive bolts for attaching it to the axle housing as is conveniently done with fixed-yoke disk brakes. Between the arms 206' and 206" of the yoke, which serves to retain the brakeshoes 202, 204 and 203, 205, an opening 206b may be provided to permit inspection of the brakeshoes and to facilitate access thereto.

The cylinder 206a' of the yoke is formed with a single-diameter bore 206 in which the stepped piston 207, 208 is axially shiftable. The larger-diameter step 207 bears directly upon the backing plate 205 whose brakeshoe lining 203 confronts the right-hand side of the brake disk 201 and defines within the bore 206a a large-diameter working chamber 218 to which fluid is supplied through a radial bore 206d from one of the compartments of a dual-network master cylinder, e.g. the twin master cylinder of FIG. 2 or the tandem master cylinder of FIG. 1 via the respective brake-fluid networks 14b, 14c or 114b, 114c.

An essential feature of this aspect of the invention is the provision of an inwardly open hollow piston 219 which is axially telescoped with the small-diameter step 208 and defines the small-diameter chamber 219a therewith. The working face 208a of member 219 is effective, upon the delivery of brake fluid to the chamber 219a to urge the brakeshoe 202, 204 to the right (arrow B), as is described in greater detail hereinafter. For delivery of fluid to the chamber 219a, we provide a radial bore 208b in the cylinder portion 206a' of the housing 206 which communicates with the other transmission networks and the other working compartments of the master cylinder. The bore 208b is connected with an axially extending recess 208b' confronting the piston 219 which is axially shiftable in the cylinder bore 206a and registering with a radial passage 208b" in this piston. A single annular seal 210 recessed in the wall of bore 206a engages the large-diameter step 207 at a location remote from its chamber 218, while a further seal 211 recessed in the interior of piston 219 engages the small-diameter step 208 at a location remote from chamber 219a. The additional seals 220 and 220' prevent leakage between the piston 219 and the housing 206. A pair of cuffs 209', functionally similar to the cuffs 9 and 109 previously described, bridge the cylinder 206a' and the backing plate 205 and piston 219, respectively, to prevent entry of contaminants into the cylinder bore.

The force-transmission means of this modification comprises a frame 221 (see FIGS. 2 and 3A) which lies in a plane parallel to the axis of the cylinder bore 206a and perpendicular to the braking faces of the disk, generally along a secant of the disk. This frame 221 has inward projections 221a and 221b bearing upon the backing plate 204 of the left-hand brakeshoe whose lining 202 confronts the disk 201, and upon the outer surface of the piston 219. Thus, when the piston 219 is urged in the direction of arrow B, the frame 221 transfers corresponding movement to the brakeshoe 202, 204 and draws the latter against the left-hand side of the disk. To prevent rotation of the piston 219 and the frame relatively to the fixed housing 206, the frame 221 may be guided between lugs 222 extending laterally from the housing 206 (see FIG. 3A).

In operation, the device of FIGS. 3 and 3A functions similarly to the system of FIG. 2. Thus, when neither fluid-transmission network is defective, fluid under pressure is delivered simultaneously to the chambers 218 and 219a, thereby urging the piston 207, 208 to the left (arrow A), while the reaction force is applied to piston 219 to drive the brakeshoe 202, 204 to the right (arrow B). If one of the brake-fluid networks fails, for instance the network supplying chamber 219a, fluid will be delivered in the usual manner to the outer annular compartment 218 and thereby urge the large-diameter step 207 in the direction of arrow A, and the piston 219 in the direction of arrow B, as previously described. Conversely, failure of the network supplying chamber 218 will nevertheless permit fluid to be delivered to chamber 219a, thereby urging the small-diameter step 208 in the direction of arrow A, and the piston 219 in the direction of arrow B. In either case, the stroke of the brake pedal necessary for actuating the brake remains constant in the event of failure of one of the transmission networks, although the amount of foot pressure required for the same braking effect is double. Here again, failure of one of the transmission networks does not decrease the frictional area of the brake which is affected.

FIG. 3B shows a modification of the system of FIG. 3, although the view of FIG. 3A pertains as well to this figure. The brake fluid from line 314c is here delivered through the frame 321, and the projection 321a to an axial bore 308b in the piston 319 which is axially shiftable in the cylinder bore 306a of housing 306. The intermediate seal 220 is eliminated and only a single seal 320' need engage the outer periphery of piston 319 at a location remote from the chamber 318. Fluid is delivered to this chamber by a radial bore 306d in the housing 306, as previously described. The stepped piston 307, 308, the piston 319 and the brakeshoes 303, 305 and 302, 304 cooperate with the disk 301, as described in connection with FIGS. 3 and 3A. In both of these systems, the circumferential entrainment of the brakeshoes is blocked by the fixed yoke 206, 306. Furthermore, the yoke 206 may be flanked by the auxiliary yoke structure shown at 12 in FIG. 1A.

In FIG. 4, we show a representative construction embodying principles of FIGS. 3 and 3B wherein, however, a stepped piston is avoided. In this embodiment, the unitary yoke 406 is formed with the actuating cylinder 406a and is fixed with respect to the brake disk 401 via a lug 416 which can be attached to the axle-housing flange in the manner previously described. The bifurcated portion of yoke 406, which reaches around the periphery of the disk 401, serves to take up the lateral force applied to the brakeshoes 402, 404 and 403, 405 when these brakeshoes frictionally engage and are entrained by the disk. Here again, the auxiliary yoke structure illustrated in FIG. 1A at 12 can flank the stationary yoke 406 of U-shaped configuration. Disk 401 is connected to the rotating vehicle member, e.g. the tire-carrying wheel disk or its axle in the usual manner.

In this embodiment, a pair of actuating pistons 407 and 408 is provided, the pistons being axially shiftable in the direction of arrow A or arrow B, respectively, in corresponding cylinder-bore sections 406a' and 406a". Piston 407 bears directly upon the backing plate 405 whose lining 403 confronts the brake face 401b of the disk while piston 408 acts via the projection 421a upon a frame 421 which extends around the disk 401 and bears via its other projection 421b upon the backing plate 404. The latter carries a brake lining 402 adapted to engage braking face 401a of the disk. The frame 421, which may be guided for movement in the axial direction and prevented from rotation by the guide lugs 222 and can have the construction illustrated in FIG. 3A, lies in a plane of the axis of the cylinder 406a intersecting the disk 401 along a secant thereof. Alternatively, the frame can be mounted upon a stationary part of the vehicle by the parallelogrammatic linkage 13 (FIG. 1A) or can be a floating or swingable frame using mounting means similar to those of the movable yokes 6 and 106.

According to the principles of this aspect of the invention, the pistons 407 and 408 are identical in construction and oriented in mirror-symmetrical relationship while being of hollow or cup-shaped configuration and displaceable in opposite directions upon the introduction of hydraulic fluid under pressure to the working compartments. Furthermore, an important feature of this invention resides in the fact that the pistons define between them independent, i.e. noninterconnected, working compartments adapted to be charged with brake fluid from the separate networks and compartments of the tandem master cylinder of FIG. 1 or the twin cylinder of FIG. 2, one of these cylinders being an outer annual chamber and the other an inner chamber. Within the cylinder 406a, therefore, we provide a cylindrical core 424 which is affixed to the wall of the cylinder body by a sectoral web 424a and has a bore 424b running axially through the projecting portion 424' and 424" of this core. The piston 407 is sealingly engaged by a ring 410' recessed in the wall of the cylinder 406a remote from an outer annular compartment 418 defined between the outer annular face of piston 408. An inner seal 411' is recessed in the piston 407 remote from a chamber 419a' between the core projection 424' and the piston 407. Similarly, the piston 408 defines the working chamber 419a" with the projection 424" of the core, carries a seal 411" remote from this chamber and is engaged by a seal 410" remote from this chamber and is engaged by a seal 410" remote from chamber 418. Dust caps 409 and 409' at each end of the cylinder prevent entry of contaminants and moisture. The core 424 can be formed unitarily with the cylinder 406a of housing 406.

A radial passage 406d delivers the brake fluid from one of the transmission networks to the outer chamber 418 whereas a further radial bore 408b communicates with the compartments 419a' and 419a" via the bore 424b. When the hydraulic system of the brake is intact, depression of the brake pedal simultaneously delivers fluid under pressure to the radial bores 406d and 408b, to the common compartment 418 and to the individual compartments 419a' and 419a". Piston 407 is displaced in the direction of arrow A to apply the brakeshoe 403, 405 directly to the disk 401, while piston 408 is moved away from piston 407 (arrow B) and transmits movement in this direction via the frame 421 to the brakeshoe 402, 404. In the event of failure of the fluid supply to passage 406d, the pressure applied at passage 408b and transmitted via bore 424b to compartments 419a' and 419a" will apply the brakeshoes in the manner previously described, albeit with less pressure. The pedal stroke will not, however, increase. Conversely, failure at passage 408b, will nevertheless permit pressurization of chamber 418 via passage 406d and the displacement of pistons 407 and 408 in the direction of arrows A and B.

This embodiment has the advantage common to the systems of FIGS. 3 and 3B that a relatively compact construction is obtainable and the most massive portions of the brake assembly can be rigidly fixed to the vehicle frame. Mounting and construction costs are thus minimized and wear is reduced. Only the force-transmitting frame 421 is movable with the pistons and brakeshoes and the radial dimensions of the brake structure (with respect to the axis of the disk) can be held down to permit the structure to be built into or concealed within the wheel disk.

Figure 5:
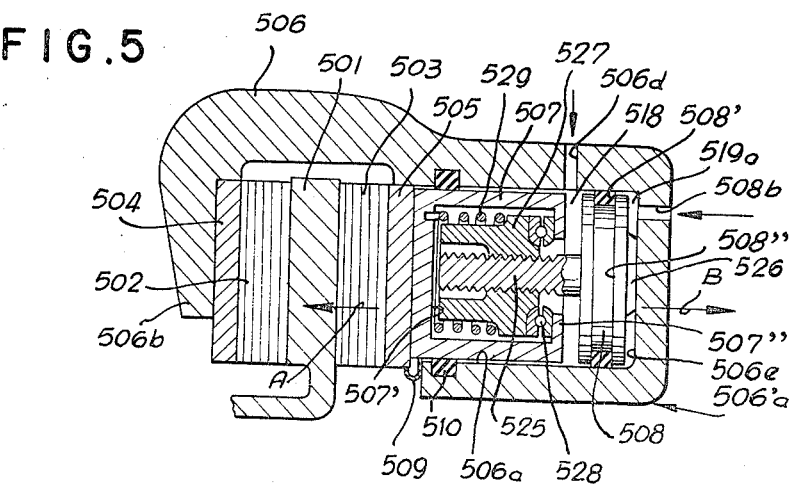
FIG. 5 is a fragmentary axial cross-sectional view of a disk brake for one-sided hydraulic actuation provided with adjusting means received in the direction-action piston.

FIG. 5 represents a brake construction, in accordance with the present invention, embodying principles of FIGS. 1, 1A, 1B, with, however, use of a pair of pistons in a movable brake yoke. The brake yoke 506 of this embodiment reaches around the periphery of the brake disk 501 and can be received in an auxiliary yoke as illustrated at 12 in FIG. 1A. In this case also, the yoke 506 is axially shiftable via a linkage 13 of FIG. 1B or the usual devices which, as previously described, support the housing as a floating yoke or swingable yoke.

According to this invention, a flange 506b of this yoke yoke engages the backing plate 504 whose lining 502 engages one surface of the disk 501 while the other brakeshoe has a lining 503 carried by the backing plate 515. A generally cup-shaped, inwardly open piston 507 is axially shiftable within a cylinder bore 505, 506, 506a in the actuating cylinder 506a' which is unitarily integral with the flange 506b and the remainder of the yoke. A seal 510 engages the outer cylindrical surface of piston 507 at a location remote from the chamber 518 formed ahead of its open end. The piston 507 bears directly against the backing plate 505 to urge the shoe 503, 505 in the direction of arrow A when chamber 518 is charged with brake fluid through the radial passage 506d from, for example, the network 14b of the master cylinder 14 or the network 114b of the master cylinder 114. The second piston 508 is here provided with a threaded stem 525 extending axially into the piston 507 and a boss 526 adapted to rest against the rear wall 506e of the cylinder bore 506a. An annular seal 508' is received within a peripheral groove 508" of the piston 508 and engages the wall of the cylinder bore 506a so as to be relatively nonrotatable as a result of friction within the cylinder bore. Brake fluid may be fed behind the piston 508, i.e. to the chamber 519a by a bore 508b extending axially through the wall 506a.

A further feature of this invention resides in the provision of a self-adjusting mechanism designed to spread the pistons 507 and 508 apart to compensate for brake-lining wear and thereby advance the rest positions of the pistons in step with such wear. A particularly satisfactory self-adjusting mechanism has been found to comprise the threaded stem 525 which extends in the direction of the backing plate 505 and carries an internally threaded sleeve 527 adapted to bear upon the wall 507' of the piston 507. A thrust bearing 528 is disposed between an in-turned flange 507" of piston 507 and a shoulder of the threaded sleeve 527 while a coil spring 529 is coaxial with the sleeve and normally urges it against the flange 507". The lateral force or torque applied by the disk 501 in its circumferential direction during braking, is taken up by the auxiliary yoke 12. A cuff 509 prevents entry of contaminants into the cylinder bore 506. The nut 527 is slotted or radial passages may be provided between the balls of the thrust bearing 528 to permit the fluid pressure within chamber 518 to be applied to the surface 507' of piston 507.

During normal operation of the brake system, the brake fluid is applied simultaneously from the tandem or twin master cylinder (see FIGS. 1 and 2) to the annular chamber 519a between wall 506e and piston 508 and the chamber 518 between the pistons. There is no relative movement of the pistons and the entire piston assembly 507, 508 is driven to the left to apply the brakeshoe 503, 505 against the disk. The reaction-force chamber 519a is applied to the yoke 506 which is displaced in the direction of arrow B and draws the brakeshoe 502, 504 against the disk. The stroke of piston 508 is minimal, as has been indicated, while even the limited movement of the piston 507 in the brake-actuating direction (i.e. to the left) with entrainment of the threaded sleeve 527 in self-adjusting action, causes a substantial increase in the fluid-volume requirements of chamber 10. The pressure within this chamber is thus somewhat lower than that in chamber 519a. The ratio of pressures is, of course, compensated by properly dimensioning the pistons in the tandem master cylinder which may be a stepped tandem cylinder of conventional type, while the self-adjusting means in which the sleeve 527 rotates along the spindle 525 with increasing separation of the pistons 507, 508 also performs a unique function upon failure of one or the other brake networks.

In the event of failure of the network supplying passage 508b, the brake fluid pressure in chamber 519a is negligible and only chamber 518 is effective. Thus, the piston 507 is displaced to the left and entrains the threaded sleeve 527 in this direction to apply the brakeshoe 503, 505 directly to the disk. Since the piston 508 rests via the boss 526 against the bottom of bore 506a, the reaction force is applied in the direction of arrow B to bring the other brakeshoe 502, 504 against the disk.

Upon failure of the brake network supplying passage 506d, the higher pressure side of the stepped tandem master cylinder delivers elevated fluid pressure to chamber 509a which drives the piston 508 to the left (arrow A), compresses the spring 528 to limit reverse rotation of the threaded sleeve 527 which is frictionally engaged by the spring, and applies its force to the wall 507' of piston 507. Again, therefore, the brakeshoe 503, 505 is applied to the disk. The reaction force in chamber 518, 519a shifts the yoke 506 to the right (arrow A) and brings the brakeshoe 502, 504 into contact with the disk. The brake operation is thus independent of the pressure at passage 506d and the related network. In general, the piston 508 can be considered to be in its rest position most of the time since, even when it is rendered ineffective, its stroke is relatively small. In fact, the stroke of this piston need not be any greater than that which would just permit the piston to obstruct passage 506d. This system has the advantage that a dual-piston actuation is obtainable with a minimum of cylinder length and with a most compact construction. It should be especially noted that the pistons 507 and 508 move in the same direction when chamber 519a is pressurized and that the piston 508 can be a so-called disk piston of relatively limited axial length and stroke while the other piston 507 is hollow to receive the self-adjusting mechanism.

Figure 6:
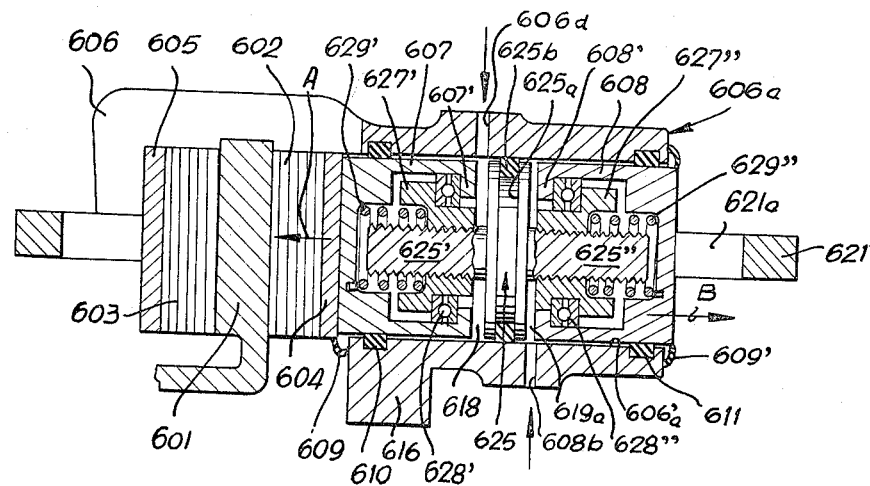
FIG. 6 is an axial cross-sectional view through a brake applying the principles of FIG. 5 to a stationary-housing construction.

FIG. 6 shows a system similar to that of FIG. 5 wherein, however, the brake-fluid requirements of the individual chambers are identical as in the case for the systems of FIGS. 1–4. Furthermore, force transmission is effected via a frame structure of the type employed in the system of FIGS. 3, 3A, 3B and 4.

The yoke 606 of this embodiment is affixed to the axial housing via a lug 616 and reaches around the periphery of the disk 601 while forming the lateral stops for the brakeshoes 602, 604 and 603, 605, although the auxiliary yoke 12 of FIG. 1A may flank the housing structure 6 to reinforce its resistance to lateral stress. The term "lateral" is used here to refer to sidewise entrainment of the brakeshoes upon their frictional engagement with the disk. In this embodiment, the yoke is provided with a cylinder 606a on one side of the disk 601 and with a cylinder bore 606a' open at both ends. A piston 607, which can in all respects be identical to the oppositely moving piston 608, is disposed symmetrically therewith and opens in the direction of the other piston while bearing directly upon the backing plate 604 which carries the lining 602. A pair of sealing sleeves 609 and 609' connect the ends of the cylinder 606a with the pistons 607 and 608 to prevent the entry of contaminants into the cylinder bore. Piston 608, in turn, acts upon a projection 621a of a frame 621 which transmits force to the backing plate 605 carrying the lining 603 as shown in FIG. 3A. Here, too, the frame 621 can be of the floating or swingable type, may be guided in lugs of the type shown at 222, or can be mounted upon a parallelogrammatic linkage such as that shown at 13 in FIG. 1B.

Between the pistons 607 and 608, we provide an intermediate disk-shaped piston 625 of the type illustrated in FIG. 5 at 508. The piston 619 carries a pair of threaded stems 625' and 625" projecting axially into the interiors of the hollow pistons 607 and 608. An annular peripheral groove 625a in the disk of piston 625 receives a sealing ring 625b in engagement with the wall of the cylinder bore 606a'. Thus, the piston 625 defines, with the piston 607, a fluid chamber 618 communicating with the interior of the piston while an oppositely effective chamber 619a is formed between piston 625 and the piston 608. Brake fluid is fed from a transmission network (e.g. network 14b or 114b and a dual master cylinder as previously described) into the radial passage 606d communicating with chamber 618 and from the other transmission network (e.g. 14c or 114c) via a bore 608b into chamber 619a. Within each of the pistons 607, 608, there is provided a respectively self-adjusting device of the type illustrated in FIG. 5 and comprising a threaded sleeve 627' and 627" screwed onto the respective shanks 625' and 625" and engageable by flange 607" or 608" of the respective pistons via thrust bearings 628' and 628". Friction springs 629' and 629" anchored to the pistons 607 and 608, respectively, engage the sleeves 627' and 627". A pair of annular seals 610 and 611 engage the outer peripheries of the piston 607 and 608 at locations remote from the respective chambers 618 and 619a.

During normal brake operation, identical quantities of fluid under the same pressure are applied via a respective network to the chambers 618 and 619a in which the fluid acts upon identically effective surface areas of the pistons 607 and 608. Piston 607 is urged to the left (arrow A) and applies the brakeshoe 602, 604 directly to one face of the disk 601. Simultaneously, the piston 608 is displaced to the right (arrow B) and entrains the frame 621 in this direction to urge the other brakeshoe 603, 605 against the disk. Upon failure in the brake network supplying passage 606d, the pressure upon piston disk 625 drives the latter to the left so that its sleeve 627' engages the piston 607 and applies the latter forcibly against its brakeshoe 602, 604, the piston 608 supplying brakeshoe 603, 605 as previously described.

Conversely, failure of the supply to chamber 619a permits the fluid entering chamber 618 under pressure to drive piston 625 to the right (arrow B) and bring the sleeve 627" to bear against piston 608 which, in turn, transmits force to the frame 621. Upon wear of the brake linings, the relative separation between pistons 607 and 608 increases to permit these pistons to entrain the sleeves 627' and 627" in opposite directions, thereby rotating these sleeves along the respective threaded shanks to establish new rest positions for the pistons. The stroke of the piston 625 is, of course, relatively insignificant. Springs 629' and 629" frictionally engage the sleeves upon their compression to restrict relative rotation of sleeve and shank. In the systems of FIGS. 5 and 6, the disk piston serves to lock the pistons 507, 508 and 607, 608 relative to one another upon failure of one of the fluid supply networks.

Figure 7:
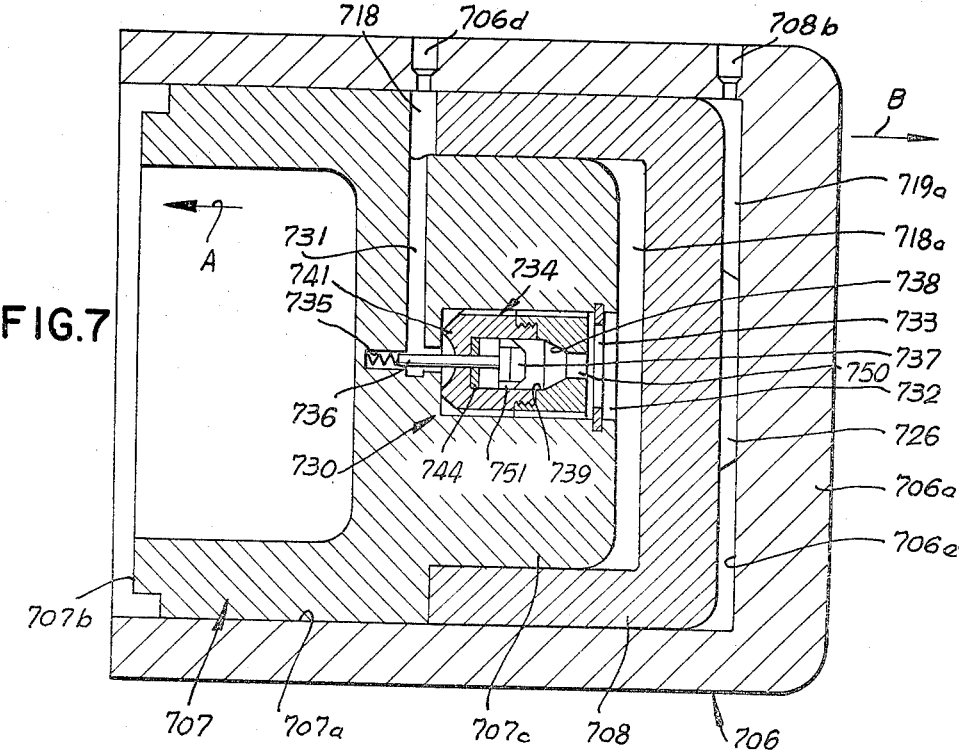
FIG. 7 is a diagrammatic axial cross-sectional view drawn to a greatly enlarged scale showing double-acting valve means for maintaining the effective cross-section of the actuating cylinder constant in spite of failure in one of the transmission lines.
Figure 8:
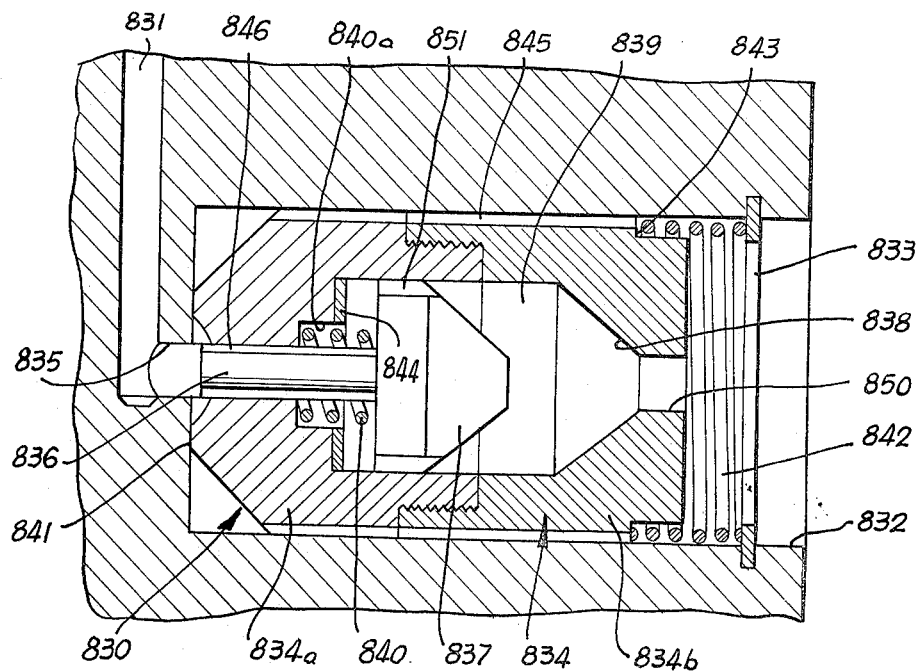
FIG. 8 is an enlarged detail view of a valve of the type suitable for use in the system of FIG. 7, but with some modifications.

In FIGS. 7 and 8, we show a valve assembly for a stepped-piston construction (see FIG. 2, for example) in which the brake force is maintained substantially constant in spite of the fact that there is a failure in one of the brake-supply networks. According to this aspect of the invention, the stepped piston is slidable relatively to a cup-shaped further piston (see FIG. 3) so that an annular chamber is defined between the two pistons while a further chamber is formed behind the piston receiving the small-diameter step. In this system, a space formed between the small-diameter step and the cup-shaped piston communicates with the annular chamber and its supply port via a double-acting pressure-responsive valve which, upon failure of the fluid supply behind the non-stepped piston, will deliver substantially full brake pressure to the inner chamber so that substantially the full effective cross-section of the stepped piston operates in braking action. Upon failure of the fluid supply to the outer chamber, the valve is effective to drain the inner chamber and permit direct contact between the nonstepped piston and the stepped piston so that full brake force is again delivered.

Thus we show in FIG. 7 a wheel-brake cylinder 706a which may be used in any of the assemblies of FIGS. 1, 2 and 5, for example, as part of a housing 706 which extends around the periphery of a brake disk and co-operates with brakeshoes as described in connection with these figures. An inlet port 706d delivers brake fluid from one of the transmission networks (14b or 114b) and a corresponding dual master cylinder to an annular compartment 718 defined with the large-diameter step 707a of a stepped piston 707 which bears at 707b against one of the brakeshoes. The other brakeshoe is entrained by the yoke 706 which has the U-shaped configuration previously described and may be a floating, swingable or like housing, e.g. provided with the parallelogrammatic linkage 13 of FIG. 1B. Additionally, the auxiliary yoke 12 of FIG. 1A may be used to provide lateral support for the housing and take up the lateral forces upon the brakeshoes. A piston 708 of cup-shaped configuration opens in the direction of piston 707 and can bear against the end wall 706e of the cylinder 706a via a boss 726. A chamber 719a is thus defined behind the piston 708 and receives brake fluid from the other network (14c or 114c) via a radial bore 708b.

According to the principles of this invention, however, a further, inner chamber 718a is formed between the small-diameter step 707c of the piston 707 and piston 708, while a double-acting pressure-operated valve 730 connects the chamber 718 and passage 706d via a radial bore 731 in the piston 707 with the chamber 718a.

Referring now to FIG. 8, in which the valve structure is drawn to an enlarged scale but is otherwise similar to that of FIG. 7 but for slight variations described hereinafter, it can be seen that the valve 730 or 830 comprises a cylindrical bore 732, 832 in which a split ring 733, 833 is seated to form a stop for a valve plunger 734, 834. The plunger 734, 834 may be bipartite and composed of a pair of coaxially interconnected threaded sleeves as shown at 834a and 834b. The radial bore 731, 831 communicates with an axial passage 735, 835 receiving the stem 736, 836 of a frustoconical valve body 737, 837. The front end of this valve body is designed to seat against a frustoconically convergent valve seat 738, 838 at the end of a conically narrowing chamber 739, 839 tapering away from the bore 735, 835. A coil spring 740, seated in a blind end of bore 735, urges the stem 736 and the valve member 737 to the right while the corresponding spring 840 of the embodiment of FIG. 8 is received in an enlargement or countersunk recess 840a in the left-hand end of the valve plunger 834. The plunger 734, 834 has a tapered end at its left-hand side so that a sealing edge 741, 841 engages the wall of the bore 832 around the axial passage 735, 835. The plunger 834 in the embodiment of FIG. 8 is urged to the left by a coil spring 842 bearing against a shoulder 843 and guided around the plunger 834. At its other end, the coil spring 842 rests against the split ring 833. Within the chamber 739, 839 we provide an annular valve seat 744, 844. Additionally, the outer periphery of plunger 734, 834 is fluted as shown at 845 while flutes are provided (e.g. at 846) around the stem of the valve member. The stem 836 can be similarly fluted or received with slight clearance in its bore. The recess 848 for spring 840 is dimensioned to prevent the spring from interfering with the seating of valve member 837 upon the ring 844. Spring 842 (and a corresponding spring, not shown, acting on plunger 734) prevents the plunger from floating in the absence of fluid-pressure bias in one or the other direction and maintains a light force urging the plunger into seating engagement with the wall of the bore 832 surrounding the passage 735, 835.

During normal brake operation, the tandem or twin master cylinder (14 or 114) delivers hydraulic pressure to both passages 806d and 708b, thereby driving the valve member 737, 837 to the right and blocking the outlet passage 750, 850 from the chamber 739, 839. Further pressure delivered at bore 735, 835 lifts the plunger 734, 834 away from its seat (to the right) and delivers fluid to the chamber (718a) between the pistons 707 and 708. Piston 707 is driven to the left with a force determined by its entire effective cross-section since fluid pressure is applied in chamber 718a as well as in chamber 718. Under most conditions, however, the same pressure is generated in chamber 719a so that the pressure in chamber 718a does not materially change and the assembly 707, 708 is displaced in the direction of arrow A while the housing 706 is shifted in the direction of arrow B to apply full brake force to both brakeshoes in the usual manner. Upon release of the brake, fluid is drained from the chamber 718, 718a, and 719a in the usual manner, the fluid from chamber 718a passing the flutes or the axial grooves 751, 851 around the valve member 737, 837. It is also possible to eliminate the grooves 851 in which case the member 737 or 837 fits snugly in the bore 739, 839 and is driven to the left when the brake is released until it engages the valve seat 744, 844.

Upon failure of the rear fluid-transmission network, pressure does not develop in chamber 719a and, when the brake pedal is depressed, the piston 708 is urged into direct contact with the housing 706 and chamber 718a expands and is fully pressurized in the manner described.

Upon failure of the other network, fluid is supplied only through passage 708b to to chamber 719a, whereupon chamber 718a is compressed and pressure built up therein. The valve member 737, 837 is driven to the left until it engages the seat 744, 844 and thereby prevents further escape of fluid from chamber 718a. The fluid, being relatively incompressible, acts as a force-transmitting member affording direct mechanical connection between piston 708 and piston 707 thereby actuating the brakeshoe of the latter with full brake pressure. In the event of a leakage in valve 730, 830, the piston 708 bears directly against piston 707. In other words, the valve 730, 830 functions as the self-adjusting mechanism 625, 626, etc. and the corresponding parts of FIGS. 5 and 6. In the event of a sudden release in pressure in line 731, 831, there is a tendency for the valve member 737, 837 to be driven into its left-hand position. Only when pressure is restored, can fluid be bled from chamber 718a. Thus a failure in one or the other transmission network is automatically compensated by a spreading of the pistons without increased stroke of the brake pedal. Consequently, the driver has no warning of a brake failure and we, therefore, prefer to provide indicator means of any conventional type to indicate such failure in one of the networks.

The invention described and illustrated is believed to admit of many modifications within the ability of persons skilled in the art.

We claim:
1. A vehicle-brake system comprising:
dual-compartment master-cylinder means for independently displacing at least two brake-fluid streams;
a pair of transmission networks each connected to one of said compartments for transmission of the brake fluid displaced from said compartments; and
at least one disk brake including:
    a rotatable brake disk,
    a nonrotatable housing reaching around the periphery of the disk and forming on one side thereof an actuating cylinder,
    a pair of brakeshoes flanking said disk including
        a first brakeshoe remote from said cylinder and in force-transmitting relationship therewith and a second brakeshoe proximal to said cylinder,
a first piston received in said cylinder and acting upon said second brakeshoe proximal thereto while sub-dividing said cylinder into a pair of independent working chambers respectively communicating with said networks and individually pressurizable thereby, said piston being generally cup-shaped and opening axially away from the second brakeshoe, said housing including a core extending telescopingly axially into said piston for defining therein an inner one of said chambers, the outer of said chambers annularly surrounding said core,
a second cup-shaped piston received in said cylinder and confronting the first-mentioned piston while telescopingly receiving said core and defining therewith part of said inner working chamber and defining with said first piston part of said outer working chamber, and
a force-transmission member connecting said second piston with said first brakeshoe.

2. The system defined in claim 1 wherein said housing is a U-shaped yoke extending around the periphery of said disk, said system further comprising an auxiliary yoke flanking said housing for at least partially absorbing the lateral force applied to said brakeshoes upon their frictional entrainment with the disk.

3. The system defined in claim 1 wherein a pair of relatively slidable annular surfaces form part of said piston and the means defining said chambers in said cylinder, said disk brake further comprising a pair of annular seals respectively engaging said surfaces at locations remote from the respective chambers.

4. The system defined in claim 1 wherein said housing is a floating yoke.

5. The system defined in claim 1 wherein said housing is a swingable yoke.

6. The system defined in claim 1, further comprising a parallelogrammatic linkage connected to said housing for movably supporting same relatively to said disk.

7. The system defined in claim 1 wherein said cylinder is axially open at its ends and said pistons are of substantially similar configuration and disposed mirror-symmetrically in said cylinder, said force-transmission means comprising a frame extending around said disk and said housing and engaging said first brakeshoe.

8. The system defined in claim 7 wherein said frame lies in a plane intersecting said disk along a secant and said housing is fixed relative to said disk, said housing being of U-shaped configuration and unitary construction while forming lateral stops for said brakeshoes upon their frictional engagement with said disk.

9. The system defined in claim 8 wherein said core is integral and unitary with said housing, said core having an axial passage communicating with said inner working chamber, said housing being provided with a pair of radial ports respectively communicating with said passage and said outer working chamber.

References Cited

UNITED STATES PATENTS

| 2,497,438 | 2/1950 | Butler | 188—152 |
| 3,312,313 | 4/1967 | Moyer | 188—106 |
| 3,329,244 | 7/1967 | Neilsen | 188—106 X |
| 3,337,009 | 8/1967 | Meier | 188—152 |
| 3,158,230 | 11/1964 | Chouings | 188—73 |
| 3,372,778 | 3/1968 | Hambling | 188—152 |

FOREIGN PATENTS

| 1,335,769 | 7/1963 | France. |
| 1,338,610 | 9/1963 | France. |

GEORGE E. A. HALVOSA, Primary Examiner

U.S. Cl. X.R.

188—106